VARIABLE EQUALIZER SYSTEM HAVING A PLURALITY OF PARALLEL CONNECTED TUNED CIRCUITS

Filed April 15, 1965

INVENTORS
ALEXIS A. KWARTIROFF
MICHAEL F. TCHINNIS
BY Beale and Jones
ATTORNEYS

United States Patent Office 3,336,539
Patented Aug. 15, 1967

3,336,539

VARIABLE EQUALIZER SYSTEM HAVING A PLURALITY OF PARALLEL CONNECTED TUNED CIRCUITS

Alexis A. Kwartiroff, Sea Cliff, and Michael F. Tchinnis, Amityville, N.Y., assignors, by mesne assignments, to Giannini Scientific Corporation, Amityville, N.Y., a corporation of Delaware Filed Apr. 15, 1965, Ser. No. 448,393
13 Claims. (Cl. 333—18)

Figure 2:
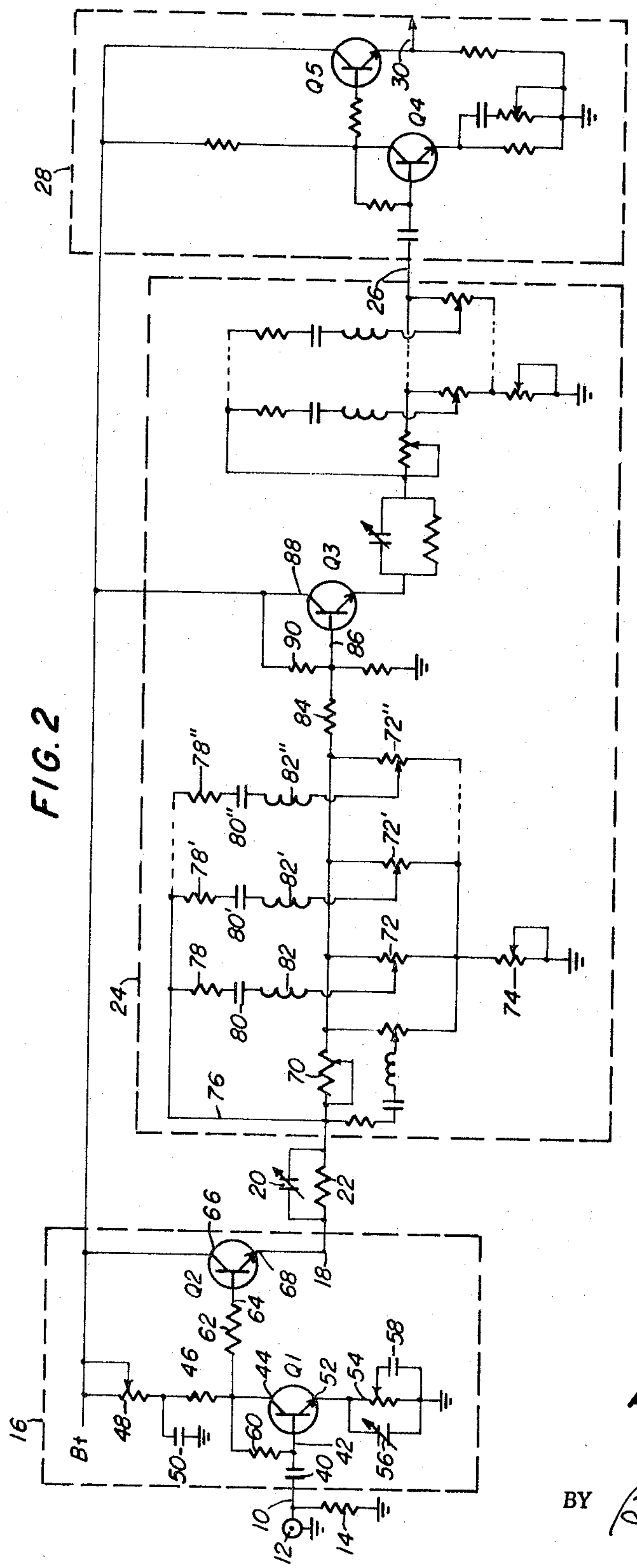

The present invention relates to electronic circuits and systems for providing equalization functions in transmission lines, and, more particularly, to equalization networks which are capable of compensating for video signal transmission losses occurring in cables of various lengths.

As is well known, a transmission line presenting an impedance to a signal in accordance with the characteristics of the cable, attenuates certain frequencies more than others. Additional irregularities in such lines result from manufacturing variations in the cables and from reflection and interaction losses due to the impedance terminations at the ends of the circuits. In order to compensate for such losses and to produce a video output signal substantially identical to the input signal, it has been known to provide equalization networks designed for specific transmission lines. However, previous equalization networks have been extremely complex, of large size and undesirably heavy, as well as being unduly limited in their video bandwidth response. The presently known devices are completely passive networks which are built into the cables and thus must be carefully matched to the lines into which they are inserted before the required equalization adjustments can be made. Such applications require that the input impedance be the same as the output impedance, and thus these networks cannot easily be used where frequent changes must be made in the lines to which they are to be connected.

The present invention overcomes the disadvantages of prior art devices by providing a completely electronic, solid state, active, adjustable equalizer system which is physically compact and suitable for use in video cable transmission systems. Further, the equalizer is designed in such a manner that it can be adapted to use with any incremental length of video transmission cable for cable lengths up to and in excess of 100 db at the highest transmitted frequency. This equalization equipment allows correction to be made for video transmission variations and changes which result from: (1) manufacturing variations in single types of cables and changes in cable types; (2) reflection and interaction losses of resistance-terminated cables at the ends of the circuits; and (3) variations in amplifiers and equalizers used in video cable transmission systems.

It has been found that the different frequencies carried by the cables require different equalization and that such equalization must restore the particular frequencies to their original amplitudes without interfering with the shape of the waveforms. Further, the networks must be capable of providing both positive and negative equalization without changing the wave shape between input and output. Since the various frequencies require different equalizaiton, it becomes necessary to provide large numbers of individual equalization networks, or circuits, in a system. The present invention provides a system which is capable of providing numerous frequency adjustment (equalization) points up to a frequency which is much higher than that of any known existing variable equalization system.

It is, therefore, an object of the present invention to provide an easily adjustable equalizer network which is relatively simple in circuit arrangement and which provides increased reliability of operation and a greater operating life than is available in prior devices.

A further object of the invention is to provide a variable equalizer capable of performing equalization over a wide frequency range.

Another object of the invention is to provide a completely electronic, solid state, adjustable equalizer which is physically compact and suitable for use in many different transmission systems.

Another object is to provide an active equalization system which is adaptable to use with all present video transmission circuits and which does not require a special design for each system.

Another object of the invention is to provide a relatively simple equalization system which utilizes an integral combination of active and passive networks, is adapted for use with any incremental length of video transmission cable and which is capable of providing equalization for any desired number of frequencies.

Briefly, the variable equalizer of the present invention utilizes a plurality of passive frequency correction networks connected in parallel between two active stages. Further, the so-called "curve fit" adjustment technique is employed to provide the desired equalization at the frequencies to be corrected by each of the passive frequency compensation networks. Whereas prior equalization networks were built into the transmission cables and thus required that both input and output match the impedance of the cable to be used with the equalizer and thus usually required that input and output impedance be identical, the present system permits the passive elements to have differing input and output impedances. This is possible since the impedance of the active elements at each end of the passive circuitry can be varied over a wide range to match the impedance of the system with the transmission lines being used. Thus, the present system permits the passive network impedances to vary over a wide range; they need not be limited to the impedance of the particular transmission line with which the equalization system is to be used. The particular arrangement of this invention therefore permits easy impedance matching between the equalization circuitry and any transmission line.

Figure 1:
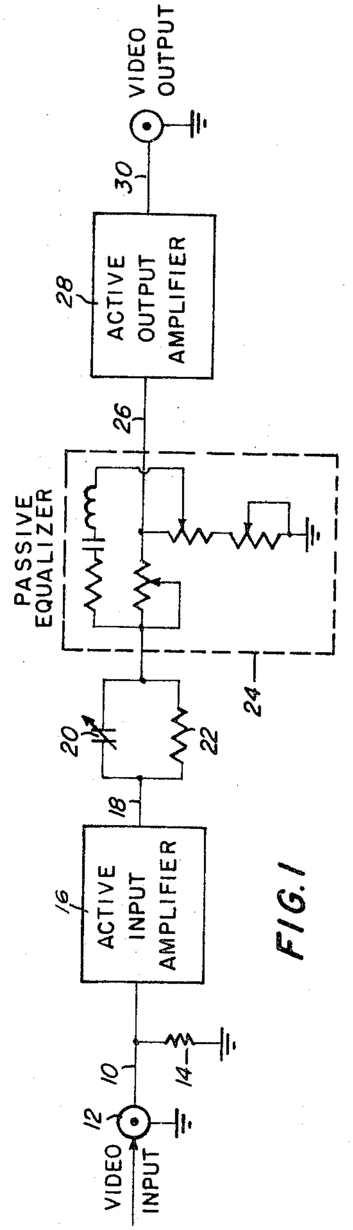

Further objects and advantages of the invention can be appreciated from the following detailed description of a preferred embodiment of the invention, selected for purposes of illustration and shown in the accompanying drawings, in which:

FIG. 1 is a simplified block diagram of a system made in accordance with the present invention; and FIG. 2 is a schematic diagram of a single embodiment of the invention.

Referring now to FIG. 1, a video input signal which is to be equalized is applied to the input lead 10 of the equalizer system of the invention. This input signal may be from any suitable source as, for example, a coaxial transmission line 12. This input signal is applied across a resistor 14, the impedance of which is matched to the impedance of the signal transmission cable to reduce reflection and interaction losses to the input of an active input amplifier 16. After amplification, the video signal is applied through variable coupling capacitor 20 and parallel resistor 22 to a passive equalization network such as that indicated at 24. Resistor 22 is utilized to both match the output impedance of the active input amplifier 16 to the input impedance of the equalization network and to establish a predetermined fixed transmission loss within the system. Capacitor 20 is utilized to compensate for stray capacitance encountered in the circuit. After suitable equalization by the passive network 24, the video signal is fed by way of line 26 to a suitable active output amplifier 28. This amplifier provides the necessary impedance match between the equalizer network and the output transmission line 30, which may be a coaxial cable, in addition to providing amplification of the equalized signal.

The equalization system of FIG. 1 thus combines the functions of two active networks with that of a passive network to provide an integral equalization system having much broader applicability than prior systems. Not only is this system adaptable for use with various transmission lines, but it has an extended operating frequency range such as is impossible to obtain with conventional passive circuitry.

Reference is now made to the more detailed showing of FIG. 2, the elements shown in FIG. 1 being indicated in FIG. 2 by corresponding numbers, with the blocks of FIG. 1 shown by dotted lines in FIG. 2. As illustrated in this schematic diagram, the active input amplifier 16 is comprised of a feedback-stabilized amplifier which provides high frequency gain compensation in addition to performing impedance matching functions.

The first stage of amplifier 16 is comprised of transistor Q1 connected in normal common-emitter amplifier configuration. The input video signal is applied through capacitor 40 to the base electrode 42 of the transistor. Collector 44 is connected through resistor 46 and potentiometer 48 to a supply of positive bias voltage. A capacitor 50 is connected between the junction of resistors 46 and 48 and ground. Emitter electrode 52 is connected through the parallel arrangement of potentiometer 54 and variable capacitor 56 to ground, the movable arm of potentiometer 54 being connected through a capacitor 58 to ground. Potentiometer 54 is provided to aid the high frequency, and potentiometer 48 the low frequency gain control of the amplifier. Feedback resistor 60 is connected between the collector and base of Q1 to provide local D.C. feedback stabilization.

The output from transistor Q1 appearing on collector electrode 44 is fed through resistor 62 to the base electrode 64 of emitter follower transistor Q2. Electrode 66 of Q2 is connected to a source of positive bias voltage while the emitter 68 is connected through resistor 22, potentiometer 70, potentiometer 72 and potentiometer 74 to ground.

The amplified video signal from amplifier 16 passes through impedance 22 to the equalizing network 24 which is made up of any number of known variable equalizer circuits, the number of such circuits used and their setting being dependent on the transmission characteristics for which equalization is desired. The basic equalizer circuit used here is a modified version of a standard tuned circuit and may be traced through line 76, resistor 78, capacitor 80, inductor 82 and potentiometer 72 to potentiometer 74. Any desired number of similar equalizer circuits may be connected in parallel with this basic circuit, as indicated by the primed and double-primed numbers, the number of such circuits depending only on the number of frequencies to be equalized. The values of capacitors 80, 80′ and 80″ and the values of inductors 82, 82′ and 82″ are determined by the specific frequencies which their respective circuits are to equalize.

All frequencies except those determined by the relationships $$F=1/2\pi\sqrt{LC} \quad (1)$$

$$Q=\omega L/R \quad (2)$$

will be transmitted through the passive network, where L and C are the inductance and capacitance of inductors 82, 82′ and 82″ and capacitors 80, 80′ and 80″, R is the resistance of resistors 78, 78′ or 78″, F is the frequency of a specific equalizer circuit, and Q is the selectivity, or bandwidth, of a circuit. The amplitude of the signal passing through equalization network 24 is determined only by the value of the resistor 22, potentiometer 70 and parallel potentiometers 72, 72′ and 72″, inasmuch as the passive circuitry presents a very low impedance to frequencies other than those selected for attenuation. The frequencies determined by the relationships of Formulas 1 and 2 will be acted upon by the passive circuitry. Potentiometers 72, 72′, 72″ acting as voltage dividers in conjunction with potentiometer 70 and potentiometer 74, control the magnitude of the frequencies selected by each equalizer circuit. By reason of the fact that resistor 22 establishes a fixed transmission loss in the system, adjustment of potentiometer 72 permits both positive and negative equilization control, that is, the amplitude of the particular frequency selected by the individual equalizer circuit may be positive or negative with respect to the level established by resistor 22, with the frequency response being the same in both the positive and negative directions. The relationship between resistor 22, potentiometer 70, potentiometer 72, potentiometer 74, resistor 78, capacitor 80, and inductor 82 determines the bandwidth shape of the passive circuit with respect to the selected frequency and establishes the magnitude of the signal at this frequency. Of course, each individual equalizer circuit will affect different frequencies. Selection of these parameters then provides control of both magnitude and frequency response to a selected group of frequencies. It is this type of control that is referred to as equalization.

Although it is possible to use only passive elements in the equalizer network 24, it may be desirable in some circumstances to divide the passive elements into several stages connected by amplifiers in the manner shown in FIG. 2. Such circumstances may exist, for example, where a large number of frequencies must be equalized or where a long transmission line is involved and additional amplification is desired. As illustrated in FIG. 2, the two stages of passive elements are connected by means of a transistor Q3. The output of the first equalization stage is applied through resistor 84 to base electrode 86 of Q3. The collector 88 of Q3 is connected to a source of positive bias voltage as well as through the resistor 90 to the base electrode to form a feedback circuit providing local feedback stabilization. The transistor Q3 is connected in emitter follower configuration in the same manner as transistor Q2, the emitter circuit to ground being traced through a similar sequence of resistors and potentiometers. The second stage of the passive equalizer network is substantially identical to the first, the values of the several parameters being again selected in accordance with the frequencies which are to be equalized.

The output signal from equalizer network 24 is fed through line 26 to the active output amplifier 28, which may be identical to the active input amplifier 16. The output amplifier is comprised of transistor Q4 connected to conventional common-emitter amplifier configuration and transistor Q5 connected to an emitter-follower configuration. The use of the emitter-follower stage of transistor Q5 is optional and need be utilized only if the transmission line to which the output signal is to be applied is of low impedance. If a high impedance load is to be fed, the emitter-follower stage may be bypassed.

It should be noted that in coupling the stages of the passive equalizer network, it may be desirable to utilize an amplifier stage in conjunction with the emitter-follower stage of transistor Q3. The inclusion of such an amplifier is optional and may depend on the general application of the equalizer system. Similarly, the exact configuration of the input and output amplifiers 16 and 28 may depend to a certain extent upon the ultimate use of the system; however, the use of variable gain stages permits a single design to be adapted to a wide variety of uses, giving a much more flexible equalizer system than was available in the prior art.

By insuring that the output impedance of amplifier 16 and the input impedance of amplifier 28 are sufficiently high, the impedance levels seen by the passive networks 24 can vary within wide limits without affecting the operation of the passive circuitry, resulting in considerable simplification of the equalization system.

There has been illustrated a simplified, variable equalizer system which may be adapted to a wide range of uses without requiring special design considerations as to impedance matching with specific transmission cables, and the like. The system is capable of providing frequency equalization for a large number of frequencies as compared to prior equalization systems. This extension of operating range is achieved through the use of active amplifier stages at the input and output of the system, thus avoiding the difficulties of other equalizers which utilize passive circuitry that must be matched to the particular video transmission line being used. However, the scope of the invention is not limited to the specific embodiment shown but includes the various alternatives and modifications that fall within the true spirit and scope of the invention as defined by the following claims.

What is claimed is:

1. A variable equalizer system for compensating for signal losses in a video transmission line comprising, an active input circuit for receiving input signals from said transmission line, a passive equalizer network and an active output circuit connected in series, said equalizer network having an input line and an output line and including variable voltage divider means connected between said input line and a ground reference point, a plurality of inductive-capacitive tuned circuits each connected in parallel with each other and in parallel with at least a portion of said voltage divider means, said output line being connected to said voltage divider means whreby compensated output signals from said equalizer network are applied to said active output circuit.

2. The variable equalizer system of claim 1, further including a second passive equalizer network identical in structure to said first-named passive equalizer network and connected by means of active amplifier means in series with said first-named passive equalizer network to provide two stages of equalization.

3. The variable equalizer system of claim 1, wherein said voltage divider means includes first resistor means connected in series between said input line and said output line.

4. The variable equalizer system of claim 1, wherein each of said tuned circuits is connected through a variable portion of said voltage divider means to said ground reference point, the portion of said voltage divider means connected in each said tuned circuit determining the polarity and magnitude of equalization provided by said tuned circuit.

5. The variable equalizer system of claim 1, wherein said active input circuit includes first amplifier means and first impedance matching means coupled to the input line of said equalizer network through an RC network, said first impedance matching means including transistor means connected in emitter-follower configuration, said RC network and said voltage divider means being connected in the emitter circuit of said transistor means.

6. The variable equalizer system of claim 5, wherein said active output circuit comprises second amplifier means and second impedance matching means including second transistor means connected in emitter-follower configuration, whereby said active input and output circuits provide impedance matching between said equalizer network and said transmission line to permit equalization of a broad frequency range of signals.

7. The variable equalizer system of claim 3, wherein said voltage divider means further includes second resistor means having at least two terminals, one terminal being connected to said ground reference point, and a plurality of parallel-connected equalizer potentiometers connected between said output line and the other terminal of said second resistor means.

8. The variable equalizer system of claim 7, wherein each of said equalizer potentiometers has a movable arm included in a corresponding tuned circuit, whereby at least a part of each equalizer potentiometer is in series with its corresponding tuned circuit.

9. The variable equalizer system of claim 8, wherein said second resistor means is variable, and wherein adjustment of said movable arms determines the polarity and magnitude of equalization provided by said tuned circuits.

10. The variable equalizer system of claim 9, wherein each of said tuned circuits is resonant at a selected frequency to be compensated, the setting of the movable arm in each tuned circuit determining whether signals of the corresponding selected frequency are attenuated or boosted.

11. The variable equalizer system of claim 10, wherein each of said tuned circuits includes capacitive and inductive means connected in series, each of said tuned circuits having a predetermined center frequency and bandwidth.

12. The variable equalizer system of claim 4, wherein each of said tuned circuits comprises a capacitor and inductor connected in series, each of said tuned circuits having a predetermined resonant frequency and bandwidth, whereby only selected input signals are passed by said tuned circuits.

13. The variable equalizer system of claim 12, wherein the input signals selected by said tuned circuits bypass said portion of said voltage divider means and the remaining input signals pass through said portion of said voltage divider means to said output line.

References Cited

UNITED STATES PATENTS

| | | | |
|---|---|---|---|
| 1,885,798 | 11/1932 | Brand | 333—28 |
| 2,070,656 | 2/1937 | Grossman | 330—154 |
| 2,164,492 | 7/1939 | Blumlein et al. | 333—28 X |
| 2,907,838 | 10/1959 | Ross. | |

HERMAN KARL SAALBACH, *Primary Examiner.*

P. L. GENSLER, *Assistant Examiner.*